Figure 1:
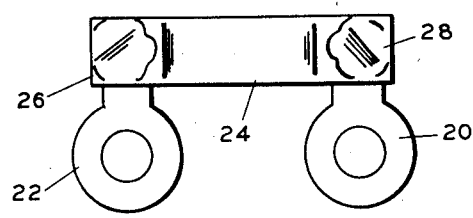

April 23, 1957  C. L. McALISTER  2,790,049
PROTECTORS FOR ELECTRIC CIRCUITS
Filed July 11, 1955

INVENTOR.
Craig L. McAlister
BY
Roy Eilers
ATTORNEY.

Patented Apr. 23, 1957

2,790,049

PROTECTORS FOR ELECTRIC CIRCUITS

Craig L. McAlister, Overland, Mo., assignor to McGraw Electric Company, Elgin, Ill., a corporation of Delaware Application July 11, 1955, Serial No. 521,119

9 Claims. (Cl. 200—142)

This invention relates to improvements in protectors for electric circuits. More particularly, this invention relates to improvements in thermally responsive circuit-breaking devices.

It is therefore an object of the present invention to provide an improved thermally responsive circuit-breaking device.

It is usually desirable and advisable to protect electrically heated equipment against overheating. One standard and well-recognized method of protecting such equipment against overheating contemplates the use of thermally responsive circuit-breaking devices, in series with the electrical heating elements of such equipment. Whenever the electrically heated equipment tends to become overheated, the circuit-breaking devices will open the circuits to those heating elements and thereby prevent further heating of that equipment. The thermally responsive circuit-breaking device of the present invention is adapted to be connected in series with the electrical heating element of an electrically heated unit to protect that unit against overheating. It is therefore an object of the present invention to provide an improved thermally responsive circuit-breaking device that can be connected in series with the electrical heating element of an electrically heated unit to protect that unit against overheating.

To be acceptable, a thermally responsive circuit-breaking device must be certain and sure in operation. This means that such a device must be able to open the circuit without generating a sustained electric arc. Also, to be acceptable, a thermally responsive circuit-breaking device must be of quite small size. This usually means a small arcing gap between the current-carrying contacts; and such a gap can lead to sustained arcing. The present invention, however, provides a small-size thermally responsive circuit-breaking device that has a large circuit-breaking gap, and thereby obviates the arcing dangers to which many prior thermally responsive circuit-breaking devices were subject. It is therefore an object of the present invention to provide a small-size thermally responsive circuit-breaking device which has a large circuit-breaking gap.

The thermally responsive circuit-breaking device provided by the present invention has a support of electrically insulating material and has terminal-receiving surfaces at the opposite ends of that support. Intermediate those terminal-receiving surfaces is a hump. Electrically conducting terminals are mounted at the terminal-receiving surfaces of the support, and those terminals are bridged by a flexible conductor. That flexible conductor is made flat, but its center is bent upwardly by the hump. That conductor tends to restore itself to its initial flat condition and thus move away from the terminals; hence the restorative forces within that conductor provide the bias necessary to effect opening of the circuit whenever the electrically heated unit tends to overheat. Heat softenable material will normally resist the restorative forces in the conductor, but that material will yield to those restorative forces and permit opening of the circuit before the unit becomes overheated. The provision of the hump increases the effective restorative forces of the conductor and also the size of the circuit-breaking gap, and thereby prevents sustained arcing. It does this by serving as a fulcrum that is located at the approximate center of the flexible conductor and that is physically displaced from the plane of the terminal-receiving surfaces. It is therefore an object of the present invention to provide a thermally responsive circuit-breaking device which has a support with two terminal-receiving surfaces and with an intermediate hump.

The intermediate hump is arcuate, and it thus permits the flexible conductor to be bent over it without creating sharp fatigue stresses in that conductor. Furthermore, the arcuate configuration of that hump enables that conductor to engage, and effect heat exchange with, a sizeable part of the support.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing, Fig. 1 is a plan view of a thermally responsive circuit-breaking device that is made in accordance with the principles and teachings of the present invention.

Figure 2:
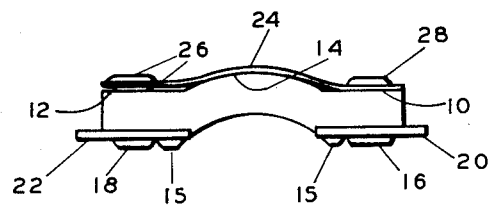
Figure 3:
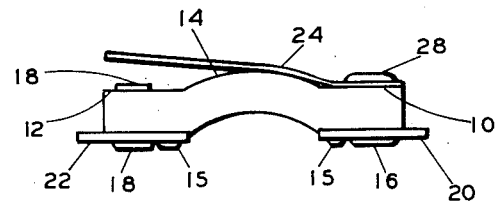
Figure 4:
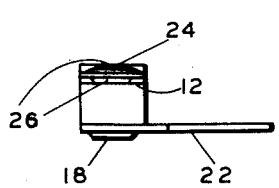
Figure 5:
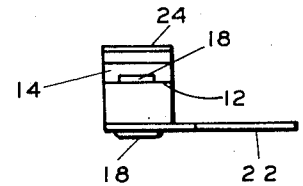
Figure 6:
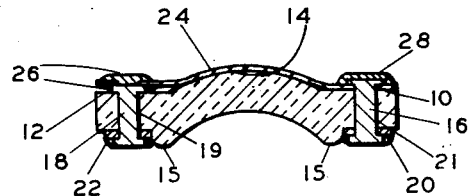

Fig. 2 is a side elevational view of the circuit-breaking device of Fig. 1,

Fig. 3 is a side elevational view of the circuit-breaking device of Figs. 1 and 2, and it shows that circuit-breaking device in "open" position, Fig. 4 is an end view of the circuit-breaking device of Figs. 1–3, Fig. 5 is an end view of the circuit-breaking device of Figs. 1–4, and it shows that device in "open" position; and Fig. 6 is a longitudinal sectional view of the circuit-breaking device of Figs. 1–5.

Referring to the drawing in detail, the numeral 10 denotes a plane terminal-receiving surface on a support for the thermally responsive circuit-breaking device provided by the present invention. That support is made of electrically insulating material such as porcelain, steatite or the like. As shown in the drawing, the terminal-receiving surface 10 is at one end of that support. A similar plane terminal-receiving surface 12 is provided at the other end of that support. The terminal-receiving surfaces 10 and 12 are co-planar. Intermediate the two plane terminal-receiving surfaces 10 and 12 is a hump 14 of arcuate configuration. This hump projects upwardly above the plane of the surfaces 10 and 12; and thus its elevation is higher than that of either of the surfaces 10 and 12. The highest point of the hump 14 is substantially half way between the terminal-receiving surfaces and the ends of the support. Foot-like projections 15 are also provided on the under side of the support.

The support has openings 19 and 21 extending vertically downwardly from the terminal-receiving portions 12 and 10 respectively. Those openings receive the terminals 18 and 16, which are shown in the drawing as rivets. Solder lugs 20 and 22 are telescoped over the lower ends of the terminals 16 and 18 before those lower ends are riveted over. These solder lugs have openings through them, and those openings receive the lead-in conductors which connect the thermally responsive circuit-breaking device with the electrically heated unit to be protected.

The openings in the solder lugs 20 and 22 facilitate the securement of those lead-in conductors to the solder lugs.

An elongated strip 24 of flexible metal that has good electrical conductivity, as for example Phosphor bronze, has an opening at one end thereof. That strip is made large enough so it will generate very little heat during operation of the circuit-breaking device. The opening in the said one end of strip 24 receives the shank of terminal 16. The strip 24 is preferably made flat or slightly concave, but when that strip is assembled with the support, as shown in Figs. 2 and 6, it will be generally convex.

When terminal 16 is telescoped downwardly through the opening in the said one end of the strip 24, is passed downwardly through the opening 21 in the support, is passed through an opening in the narrow end of solder lug 20, and is then riveted over, that terminal holds the right hand portion of strip 24 deformed downwardly toward the support, as indicated particularly in Fig. 3. The right hand end of that strip will abut and be parallel to the terminal-receiving surface 10, and the portion of that strip which is intermediate the hump 14 and the terminal-receiving surface 10 will be deformed until its upper surface is concave.

In holding the right hand end of the strip 24 in abutting relation to the terminal-receiving surface 10, and also in holding the said portion of that strip deformed in that manner, the terminal 16 forces the free end of that strip to move upwardly and away from the terminal-receiving portion 12 and from the terminal 18. That terminal is telescoped downwardly through the opening 19 and through an opening in the narrow end of solder lug 22, and is then riveted over. Hence, as indicated particularly in Fig. 3, the hump 14 serves as a fulcrum for the flexible strip 24; and the restorative forces within that strip bias the free end of that strip for movement to an "open" position that is a good distance away from the terminal 18.

Heat softenable material 26, usually a solder that melts at temperatures below five hundred degrees Fahrenheit, is used to hold the free end of the flexible strip 24 physically adjacent and in electrically conducting relation with the terminal 18. As long as the electrically heated unit, to be protected by the circuit-breaking device of the present invention, is operating within its normal temperature limits the heat softenable material 26 will hold the free end of the strip 24 in electrically conducting relation with the terminal 18. However, when the temperature of that unit rises to, and remains for appreciable periods of time at, levels above those normal temperature limits, the heat softenable material 26 will lose its holding power and free the free end of strip 24. Thereupon, the restorative forces in that strip will move that free end to the position shown in Figs. 3 and 5. At such time, the circuit between the solder lugs 20 and 22 will be broken at terminal 18, and a sufficiently large gap will be opened to prevent sustained arcing.

Solder 28 is applied to the upper end of the terminal 16 and to the right hand end of the flexible strip 24. That solder assures a full and intimate electrical connection between the flexible strip 24 and the terminal 16.

The circuit-breaking device provided by the present invention can be connected in series with the unit to be protected, or it can be connected in series with a relay that controls the flow of current to that unit. In either event, that device will be positioned where it can respond to the heat generated in that unit. Under normal operating conditions of the said electrically heated unit, the amount of heat which is transferred from that unit to the circuit-breaking device of the present invention will not be great enough to raise the temperature of the heat softenable material 26 to the point where that material will soften. However, if that unit gets hotter than normal, and if it stays hot for an appreciable period, the heat reaching the circuit-breaking device of the present invention can raise the temperature of that heat softenable material to the value at which that material loses its holding power. Thereupon, the restorative forces within the flexible strip 24 will move the free end of that strip away from the terminal 18 and break the circuit. Subsequently, no current will be able to flow to the electrically heated unit, and it will thus be kept from "burning out." Furthermore, the hump 14 will coact with the downward deformation of the portion of strip 24 between the hump 14 and the surface 10 to provide such a large circuit-breaking gap that arcing cannot be sustained.

If desired, the arrangement of parts at the left hand end of the support could be duplicated at the right hand end of that support. Where that is done, the flexible strip 24 will have two free ends held by heat softenable material; either or both of those ends could move to open the circuit.

The support will absorb heat from the flexible strip 24 and from the heat softenable material 26. Such absorption is desirable because it avoids needless opening of the circuit due to transient fluctuations in the temperature of the electrically heated unit, that are harmless. That absorption will not, of course, keep the heat softenable material 26 from softening when the electrically heated unit experiences sustained high temperatures. The engagement between the flexible strip 24 and the hub 14 is particularly helpful in avoiding needless opening of the circuit because it minimizes any tendency of heat to flow rapidly between the ends of the flexible strip 24. Consequently, the thermally responsive circuit-breaking device provided by the present invention will not respond to mere transient heating effects but, instead, will respond to long continued heating effects; thereby avoiding needless opening of the circuit.

Whereas the drawing and accompanying description have shown and described a preferred embodiment of the present invention, it should be apparent to those skilled in the art that various changes may be made in the form of the invention without affecting the scope thereof.

What I claim is:

1. A thermally responsive circuit breaking device that comprises a support of electrically insulating material, said support having two spaced apart terminal-receiving portions and having another portion intermediate said terminal-receiving portions, said intermediate portion being higher than either of said terminal-receiving portions, an electrically conducting terminal secured to one of said terminal-receiving portions of said support, a second electrically conducting terminal secured to the second of said terminal-receiving portions of said support, a flexible element of electrically conducting material that is fixedly secured to one of said electrically conducting terminals in electrically conducting relation and that has a free end extending toward and in register with said second electrically conducting terminal, said free end of said flexible element being biased for movement out of electrically conducting relation with said second electrically conducting terminal, and a mass of heat softenable material that normally holds said free end of said flexible element and said second terminal in said electrically conducting relation, said flexible element being substantially straight whenever it is free of stress and normally being stressed by having the ends thereof immediately adjacent said terminal-receiving portions of said support and by having an intermediate portion of the length thereof bowed upwardly by said intermediate portion of said support, said heat softenable material losing its holding power and thereby freeing said free end of said flexible element for movement out of said electrically conducting relation whenever said heat softenable material is heated to a predetermined temperature.

2. A thermally responsive circuit breaking device that comprises a support of electrically insulating material, said support having two spaced apart terminal-receiving portions and having another portion intermediate said terminal-receiving portions, said intermediate portion being higher than either of said terminal-receiving portions, an electrically conducting terminal secured to one of said terminal-receiving portions of said support, a second electrically conducting terminal secured to the second of said terminal-receiving portions of said support, a flexible element of electrically conducting material that is fixedly secured to one of said electrically conducting terminals in electrically conducting relation and that has a free end extending toward and in register with said second electrically conducting terminal, said free end of said flexible element being biased for movement out of electrically conducting relation with said second electrically conducting terminal, and a mass of heat softenable material that normally holds said free end of said flexible element and said second terminal in said electrically conducting relation, said heat softenable material losing its holding power and thereby freeing said free end of said flexible element for movement out of said electrically conducting relation whenever said heat softenable material is heated to a predetermined temperature, said flexible element being resilient and engaging and being bowed by said intermediat portion of said support.

3. A thermally responsive circuit breaking device that comprises a support of electrically insulating material, said support having two spaced apart terminal-receiving portions and having another portion intermediate said terminal-receiving portions, said intermediate portion being higher than either of said terminal-receiving portions, an electrically conducting terminal secured to one of said terminal-receiving portions of said support, a second electrically conducting terminal secured to the second of said terminal-receiving portions of said support, a flexible element of electrically conducting material that is fixedly secured to one of said electrically conducting terminals in electrically conducting relation and that has a free end extending toward and in register with said second electrically conducting terminal, said free end of said flexible element being biased for movement out of electrically conducting relation with said second electrically conducting terminal, and a mass of heat softenable material that normally holds said free end of said flexible element and said second terminal in said electrically conducting relation, said flexible element being substantially straight whenever it is free of stress and normally being stressed by having the ends thereof immediately adjacent said terminal-receiving portions of said support and by having an intermediate portion of the length thereof bowed upwardly by said intermediate portion of said support, said heat softenable material losing its holding power and thereby freeing said free end of said flexible element for movement out of said electrically conducting relation whenever said heat softenable material is heated to a predetermined temperature, said intermediate portion of said support being arcuate and having its axis parallel to the axis of bowing of said intermediate portion of said flexible element.

4. A thermally responsive circuit breaking device that comprises a support of electrically insulating material, said support having two spaced apart terminal-receiving portions and having another portion intermediate said terminal-receiving portions, said intermediate portion being higher than either of said terminal-receiving portions, an electrically conducting terminal secured to one of said terminal-receiving portions of said support, a second electrically conducting terminal secured to the second of said terminal-receiving portions of said support, a flexible element of electrically conducting material that is fixedly secured to one of said electrically conducting terminals in electrically conducting relation and that has a free end extending toward and in register with said second electrically conducting terminal, said free end of said flexible element being biased for movement out of electrically conducting relation with said second electrically conducting terminal, and a mass of heat softenable material that normally holds said free end of said flexible element and said second terminal in said electrically conducting relation, said heat softenable material losing its holding power and thereby freeing said free end of said flexible element for movement out of said electrically conducting relation whenever said heat softenable material is heated to a predetermined temperature, said flexible element being resilient, said intermediate portion of said support being a fulcrum intermediate the ends of said flexible element.

5. A thermally responsive circuit breaking device that comprises a support of electrically insulating material, said support having two spaced apart terminal-receiving portions and having another portion intermediate said terminal-receiving portions, said intermediate portion projecting beyond said terminal-receiving portions, an electrically conducting terminal secured to one of said terminal-receiving portions of said support, a second electrically conducting terminal secured to the second of said terminal-receiving portions of said support, a flexible element of electrically conducting material, said flexible element having terminal-engaging portions that are in register with and are in electrically conducting relation with said electrically conducting terminals, at least one of said terminal-engaging portions of said flexible element being biased away from one of said electrically conducting terminals to break said electrically conducting relation, said flexible element being substantially straight whenever it is free of stress and normally being stressed by having the ends thereof immediately adjacent said terminal-receiving portions of said support and by having an intermediate portion of the length thereof bowed upwardly by said intermediate portion of said support, and a mass of heat softenable material that normally holds said terminal-engaging portion of said flexible element in said electrically conducting relation with said one electrically conducting terminal, said heat softenable material freeing said terminal-engaging portion of said flexible element to break said electrically conducting relation whenever said heat softenable material is heated to a predetermined temperature.

6. A thermally responsive circuit breaking device that comprises a support of electrically insulating material, said support having two spaced apart terminal-receiving portions and having a hump intermediate said terminal-receiving portions, an electrically conducting terminal secured to one of said terminal-receiving portions of said support, a second electrically conducting terminal secured to the second of said terminal-receiving portions of said support a flexible element of electrically conducting material, said flexible element being in electrically conducting relation with said electrically conducting terminals, at least one portion of said flexible element being biased for movement out of said electrically conducting relation, said flexible element being substantially straight whenever it is free of stress and normally being stressed by having the ends thereof immediately adjacent said terminal-receiving portions of said support and by having an intermediate portion of the length thereof bowed away from said terminal-receiving portions of said support by said hump, and a mass of heat softenable material that normally holds said portion of said flexible element against movement out of said electrically conducting relation, said heat softenable material losing its holding power and thereby freeing said portion of said flexible element for movement out of said electrically conducting relation whenever said heat softenable material is heated to a predetermined temperature.

7. A thermally responsive circuit breaking device that comprises a support of electrically insulating material, a plane terminal-receiving surface on said support, a second plane terminal-receiving surface on said support, a portion of said support intermediate said terminal-receiving portions being displaced from the planes of said terminal-receiving portions, an electrically conducting terminal secured to one of said terminal-receiving surfaces on said support, a second electrically conducting terminal secured to the second of said terminal-receiving surfaces on said support, a resilient conductor that is normally in electrically conducting relation with said electrically conducting terminals, said resilient conductor tending to break said electrically conducting relation, said flexible element being substantially straight whenever it is free of stress and normally being stressed by having the ends thereof immediately adjacent said terminal-receiving portions of said support and by having an intermediate portion of the length thereof bowed by said intermediate portion of said support, and a mass of heat softenable material that normally holds said resilient conductor against breaking said electrically conducting relation, said heat softenable material losing its holding power whenever said heat softenable material is heated to a predetermined temperature.

8. A thermally responsive circuit breaking device that comprises a support of electrically insulating material, a plane terminal-receiving surface on said support, a second plane terminal-receiving surface on said support, a portion of said support intermediate said terminal-receiving portions being displaced from the planes of said terminal-receiving portions, an electrically conducting terminal secured to one of said terminal-receiving surfaces on said support, a second electrically conducting terminal secured to the second of said terminal-receiving surfaces on said support, a resilient conductor that is normally in electrically conducting relation with said electrically conducting terminals, said resilient conductor tending to break said electrically conducting relation, and a mass of heat softenable material that normally holds said resilient conductor against breaking said electrically conducting relation, said heat softenable material losing its holding power whenever said heat softenable material is heated to a predetermined temperature, said intermediate portion of said support engaging and bowing said resilient conductor.

9. A thermally responsive circuit breaking device that comprises a support of electrically insulating material, said support having two spaced apart terminal-receiving portions and having another portion intermediate said terminal-receiving portions, said intermediate portion being higher than either of said terminal-receiving portions, an electrically conducting terminal secured to one of said terminal-receiving portions of said support, a second electrically conducting terminal secured to the second of said terminal-receiving portions of said support, a flexible element of electrically conducting material that has one end thereof fixedly secured to one of said electrically conducting terminals in electrically conducting relation by a fastener and that has a free end extending toward and in register with said second electrically conducting terminal, said free end of said flexible element being biased for movement out of electrically conducting relation with said second electrically conducting terminal, and a mass of heat softenable material that normally holds said free end of said flexible element and said second terminal in said electrically conducting relation, said heat softenable material losing its holding power and thereby freeing said free end of said flexible element for movement out of said electrically conducting relation whenever said heat softenable material is heated to a predetermined temperature, said fastener holding a section of said flexible element, intermediate said one end of said flexible element and said intermediate portion of said support, deformed toward said support.

References Cited in the file of this patent
UNITED STATES PATENTS

| | | |
|---|---|---|
| 1,868,136 | Derby | July 19, 1932 |
| 1,894,746 | Johnson | Jan. 17, 1933 |